(No Model.)
R. W. & F. GRINNELL.
LOCKED JOINT.
No. 277,480. Patented May 15, 1883.
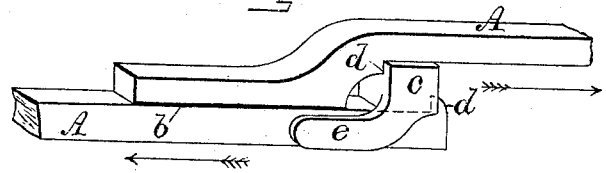
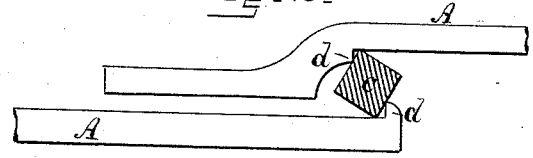
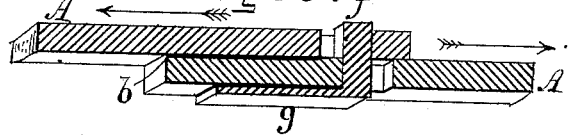
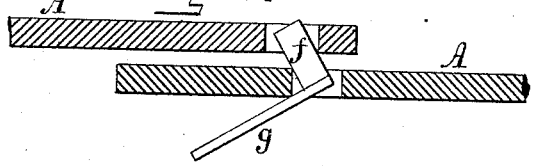
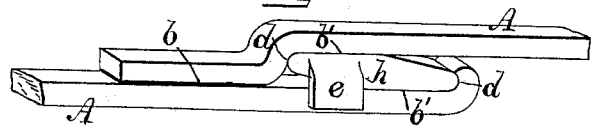
WITNESSES:
C. H. Lowther Jr.
Wm. L. Cook
INVENTORS:
Richard W. Grinnell
Frederick Grinnell
by Joseph A. Miller & Co.
Att'ys

UNITED STATES PATENT OFFICE.

RICHARD W. GRINNELL AND FREDERICK GRINNELL, OF PROVIDENCE, RHODE ISLAND; SAID RICHARD W. GRINNELL ASSIGNOR TO SAID FREDERICK GRINNELL.

LOCKED JOINT.

SPECIFICATION forming part of Letters Patent No. 277,480, dated May 15, 1883.

Application filed January 22, 1883. (No model.)

*To all whom it may concern:*

Be it known that we, RICHARD W. GRINNELL and FREDERICK GRINNELL, both of the city and county of Providence and State of Rhode Island, have invented a new and useful Improvement in Locked Joints; and we hereby declare the following to be a full, clear, and exact description of the same, reference being had to the accompanying drawings, forming part of this specification.

In the art of protecting buildings automatically against accidental fires various devices are used, in which two parts are secured by a solder fusible at a low temperature, so as to be released automatically by the action of the heat from the fire. The solder used for this purpose is liable to yield before the fusing-point is reached and allow the parts to slide on each other before the final separation. Such yielding in most devices prevents their prompt action and endangers the building.

The object of this invention is to prevent such partial yielding of the solder and to facilitate the prompt separation of the joint.

The invention consists in the use of a key, stop, or lever placed so that the moment the soldered joint yields the same will be ruptured or torn apart, as will be more fully set forth hereinafter.

Figure 1 is a view of two parts secured together by a soldered joint and a key resting against shoulders formed on the two parts, and Fig. 2 is a view of the same two parts shown in the position occupied when the soldered joint has yielded to heat and has been ruptured. Fig. 3 is a sectional view of two parts secured together by a fusible solder, and a key inserted in holes formed in these parts; and Fig. 4 is a view of the same device, showing the joint ruptured by the action of heat on the solder. Fig. 5 is a view of two parts secured together by solder and a lever placed between the two parts.

In the drawings, A A are two parts of any of the various devices used in the automatic protection of buildings against accidental fire. $b$ is the soldered joint by which the two parts are secured together. $c$ is the square key, placed so as to rest against the shoulders $d$ $d$, as shown in Figs. 1 and 2. When in this device the solder only slightly yields, the key $c$ separates the parts before any perceptible yielding is possible, tears the joint asunder, and causes the instant release of the parts, as is shown in Fig. 2. The key $c$ may be provided with the arm $e$, which, for extra security, may be soldered to one of the parts A A; but the device is perfectly operative without the arm $e$, as the soldered joint $b$ keeps the parts in place.

In Figs. 3 and 4 the key $f$ is inserted into holes formed in the parts A A. This key may be held in place by the arm $g$, secured by solder; or it may be held in any other suitable manner, such as making it slightly larger on each end. When in this device the soldered joint is weakened, so as to yield however slightly, the key $f$ acts as a lever to pry the parts asunder, as is shown in Fig. 4.

In the device shown in Fig. 5 the lever $h$ is inserted between the parts and acts as a key, resting against the shoulders $d$ $d$ as long as the soldered joint $b$ is not affected by heat. As soon, however, as it yields ever so slightly the lever $h$ separates the parts and ruptures the joint. The lever $h$ may be provided with the arm $e$, so that it can be soldered to one of the parts A A. The soldered joint $b$ may be dispensed with, and the lever $h$ secured to both parts by fusible solder at $b'$ $b'$, on the slightest softening or yielding of which the lever will suddenly rupture the joints and release the parts. Various modifications of these keys may be used, and they can be readily arranged to resist thrust as well as tensile strain.

We do not claim the use of the keys or levers for securing two parts so as to resist strain and relieve the soldered joint, as this part of our invention is described and claimed in another application of even date herewith filed by us, and to which reference is made.

Having thus described our invention, we claim as new and desire to secure by Letters Patent—

1. In devices for protecting buildings against fire, the combination of two parts secured together by a fusible solder, with a key or lever interposed between the two parts, and constructed to separate the parts upon the weakening of a solder joint, substantially as described.

2. The combination, with the parts A A, secured together by solder, of a key interposed between the two parts and secured by solder, and constructed to separate the two parts when the joint is weakened, as described.

RICHARD W. GRINNELL.
FREDERICK GRINNELL.

Witnesses:
J. A. MILLER, Jr.,
M. F. BLIGH.